US011057280B2

(12) United States Patent
Milanese et al.

(10) Patent No.: US 11,057,280 B2
(45) Date of Patent: *Jul. 6, 2021

(54) USER INTERFACE WITH EXPECTED RESPONSE TIMES OF COMMANDS

(71) Applicant: INTERNATIONAL BUSINESS MACHINES CORPORATION, Armonk, NY (US)

(72) Inventors: Nicola Milanese, Rome (IT); Stefano Sidoti, Rome (IT); Alberto Ginestroni, Rome (IT)

(73) Assignee: International Business Machines Corporation, Armonk, NY (US)

( * ) Notice: Subject to any disclaimer, the term of this patent is extended or adjusted under 35 U.S.C. 154(b) by 86 days.

This patent is subject to a terminal disclaimer.

(21) Appl. No.: 16/594,732

(22) Filed: Oct. 7, 2019

(65) Prior Publication Data

US 2020/0044944 A1 Feb. 6, 2020

Related U.S. Application Data

(63) Continuation of application No. 15/602,794, filed on May 23, 2017, now Pat. No. 10,680,908.

(51) Int. Cl.
*G06F 15/17* (2006.01)
*H04L 12/24* (2006.01)
(Continued)

(52) U.S. Cl.
CPC .......... *H04L 41/5009* (2013.01); *G06F 11/34* (2013.01); *H04L 67/36* (2013.01); *H04L 41/22* (2013.01)

(58) Field of Classification Search
CPC ..... H04L 41/5009; H04L 67/30; H04L 41/22; G06F 11/34
(Continued)

(56) References Cited

U.S. PATENT DOCUMENTS 6,446,123 B1 9/2002 Ballantine
6,738,933 B2 5/2004 Fraenkel
(Continued)

FOREIGN PATENT DOCUMENTS

WO 2016114758 A1 7/2016

OTHER PUBLICATIONS

Mell et al., "The NIST Definition of Cloud Computing," National Institute of Standards and Technology, Sep. 2011, p. 1-3, Special Publication 800-145.
(Continued)

*Primary Examiner* — Khanh Q Dinh
(74) *Attorney, Agent, or Firm* — Dmitry Paskalov

(57) ABSTRACT

A method for determining a performance trend of a software application based on performance indicators of the software application. The method receives corresponding access requests from the client computing machines from a user interface framework of the software application that includes at least one command for submitting corresponding operation requests, and estimates corresponding expected response times of the software application for serving the operation requests in response to the access requests. The expected response time of each of the operation requests is estimated according to a comparison of the operative conditions that correspond to the operation request with the performance trend. The method transmits corresponding performance artifacts that are based on the expected response times associated with the user interface framework, to the client computing machines that cause the client computing machines to provide corresponding warnings.

17 Claims, 10 Drawing Sheets

(51) Int. Cl.
*H04L 29/08* (2006.01)
*G06F 11/34* (2006.01)

(58) Field of Classification Search
USPC .............................. 709/220, 224, 226, 228
See application file for complete search history.

(56) References Cited

U.S. PATENT DOCUMENTS

| | | | |
|---|---|---|---|
| 7,426,736 B2 | 9/2008 | Cole | |
| 7,600,029 B1 * | 10/2009 | Mashinsky | H04L 41/5009 709/228 |
| 7,873,715 B1 | 1/2011 | Haber | |
| 8,200,527 B1 * | 6/2012 | Thompson | G06Q 10/06398 705/7.39 |
| 8,225,989 B1 | 7/2012 | Turocy | |
| 8,335,838 B2 | 12/2012 | Zhang | |
| 8,978,973 B2 * | 3/2015 | Turocy | G07F 7/0873 235/379 |
| 9,087,319 B2 | 7/2015 | Nguyen | |
| 9,448,916 B2 | 9/2016 | Browne | |
| 9,483,387 B1 | 11/2016 | Allocca | |
| 9,576,252 B2 | 2/2017 | Haber | |
| 9,648,168 B2 | 5/2017 | Petrovykh | |
| 10,114,733 B1 | 10/2018 | Varghese | |
| 10,327,120 B1 | 6/2019 | Dulee | |
| 10,521,805 B2 * | 12/2019 | Yurach | G06Q 30/018 |
| 10,592,404 B2 * | 3/2020 | Colaiacomo | G06F 11/3684 |
| 10,680,908 B2 * | 6/2020 | Milanese | G06F 11/3404 |
| 2002/0065910 A1 | 5/2002 | Dutta | |
| 2008/0120129 A1 | 5/2008 | Seubert | |
| 2011/0087469 A1 | 4/2011 | Kumar | |
| 2012/0030338 A1 | 2/2012 | Zhang | |
| 2012/0131554 A1 | 5/2012 | Mueller | |
| 2012/0166636 A1 | 6/2012 | Page | |
| 2012/0278135 A1 | 11/2012 | Haber | |
| 2013/0161385 A1 | 6/2013 | Graef | |
| 2014/0195446 A1 * | 7/2014 | Yurach | G06F 11/3055 705/317 |
| 2014/0376716 A1 | 12/2014 | Petrovykh | |
| 2015/0039753 A1 | 2/2015 | Zink | |
| 2018/0253372 A1 * | 9/2018 | Colaiacomo | G06F 11/368 |
| 2018/0343186 A1 | 11/2018 | Milanese | |

OTHER PUBLICATIONS

IBM: List of IBM Patents or Patent Applications Treated As Related (Appendix P), Mar. 10, 2020, pp. 1-2.

* cited by examiner

USER INTERFACE WITH EXPECTED RESPONSE TIMES OF COMMANDS

BACKGROUND

The background of the present disclosure is hereinafter introduced with the discussion of techniques relating to its context. However, even when this discussion refers to documents, acts, artifacts and the like, it does not suggest or represent that the discussed techniques are part of the prior art or are common general knowledge in the field relevant to the present disclosure.

The present disclosure relates to the information technology field. More specifically, this disclosure relates to user interfaces.

User Interfaces (UI) are provided in association with any software applications requiring interactions with human users; a typical example is a Graphical User Interface (GUI), wherein the (human) users may interact with the software application by means of visual objects (such as buttons, menus), which are displayed and manipulated on a monitor.

Very often, the user interface of a software application comprises commands that may be used to submit operation requests to the software application; the user interface is then configured to output corresponding results provided by the software application for the operation requests; for example, the operation requests may involve the execution of queries on databases that return data extracted from one or more tables thereof according to selected criteria.

In some cases, the software application may require a relatively long time to serve each operation request; for example, this may happen with queries that are complex and/or retrieve large amount of data. As a consequence, a response time of the software application (required to respond to the operation request) increases accordingly. Generally, in this period the user interface is unusable (frozen) without the possibility of performing any other action thereon (until the result of the operation request is received).

However, any long delay is quite frustrating for the user (which is stuck waiting for the completion of the operation request). Moreover, the user may be led to believe that the software application is not working or that the operation request has not been submitted correctly; this may cause the user to abort the operation request or to submit it again, in both cases further worsening the situation. This is especially true when the software application has a client/server architecture, wherein the user interacts remotely with the software application running on a server computing machine by means of a client computing machine thereof (for example, in the Internet wherein the user has to wait for the loading of a corresponding web page).

A progress indicator (for example, an animated icon or a progress bar) may be displayed to inform the user that the serving of the operation request is in progress. Particularly, the progress indicator (such as in case of the progress bar) may also provide an indication of an amount of processing that has already been performed (from which a quite approximated indication of the time remaining to complete the serving of the operation request may be inferred).

Performance monitoring techniques are also available to collect performance indicators of computing systems (for example, by measuring different metrics relating to monitored resources thereof); this information may be used to detect any problems that may be experienced by the computing systems, so that appropriate actions may be taken to remedy the situation. Particularly, U.S. Pat. No. 7,873,715 discloses a technique for instrumenting web pages for performance management, wherein a web server (receiving a request for a web page from a web client) inserts a callout to a performance management agent therein; the web client receiving the web page including the callout to the agent uses it to load the agent, which collects performance metrics on the web client and sends them to a collector server for storage and/or analysis. Moreover, US-A-2012/0030338 discloses a technique for predicting cloud service performance, wherein a parental dependency graph for a web page (encapsulating one or more dependency relationships for each web object in the web page) is extracted; a loading of the web page is simulated based on adjusted timing information of each web object, and a corresponding new page load time is estimated and compared with an original page load time of the web page to determine whether the adjusted timing information increased or decreased it.

SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is based on the idea of estimating the response times in advance.

Particularly, an aspect provides a method for accessing a software application, wherein in response to a request for a user interface framework of the software application (comprising at least one command for submitting corresponding operation requests thereto), corresponding expected response times of the software application for serving the operation requests may be estimated according to a performance trend of the software application, which expected response times may then be used to provide corresponding warnings according to the at least one command.

A further aspect provides a corresponding computer program for implementing the method.

A further aspect provides a corresponding computer program product for implementing the method.

A further aspect provides a corresponding system.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE SEVERAL VIEWS OF THE DRAWINGS

The solution of the present disclosure, as well as further features and the advantages thereof, will be best understood with reference to the following detailed description thereof, given purely by way of a non-restrictive indication, to be read in conjunction with the accompanying drawings. In the drawings.

DETAILED DESCRIPTION

With reference in particular to FIG. 1A-FIG. 1D, the general principles are shown of the solution according to an embodiment of the present disclosure.

Figure 1A:
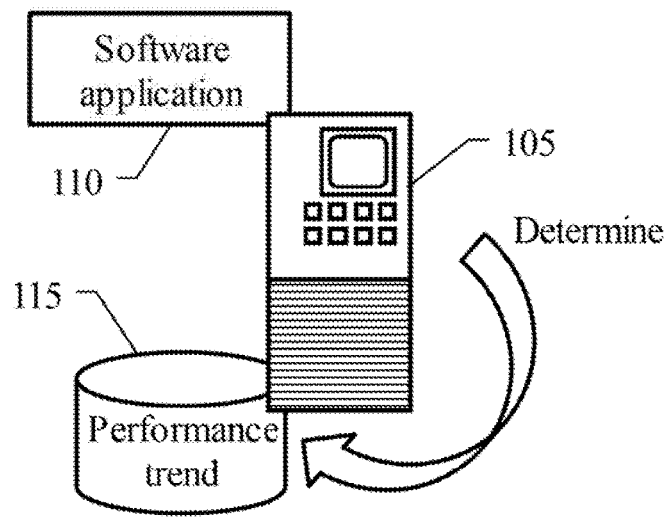
FIG. 1A-FIG. 1D show the general principles of the solution according to an embodiment of the present disclosure.

Starting from FIG. 1A, a server computing machine, or simply server 105, may run a software application 110 (such as interacting with one or more databases, not shown in the figure). For example, the software application 110 is a web application that is available via the Internet. A performance trend 115 of the software application 110 may be determined (for example, according to an environment, a test and/or a history of the software application 110). The performance trend 115 may model one or more performance indicators of the software application 110 as a function of one or more operative conditions thereof; for example, the performance trend 115 represents how a response time of the software application 110 changes for different (operation) types of operation requests that may be submitted thereto (such as defined by their queries), times of submission of the operation requests and/or workloads of the software application 110.

Figure 1B:
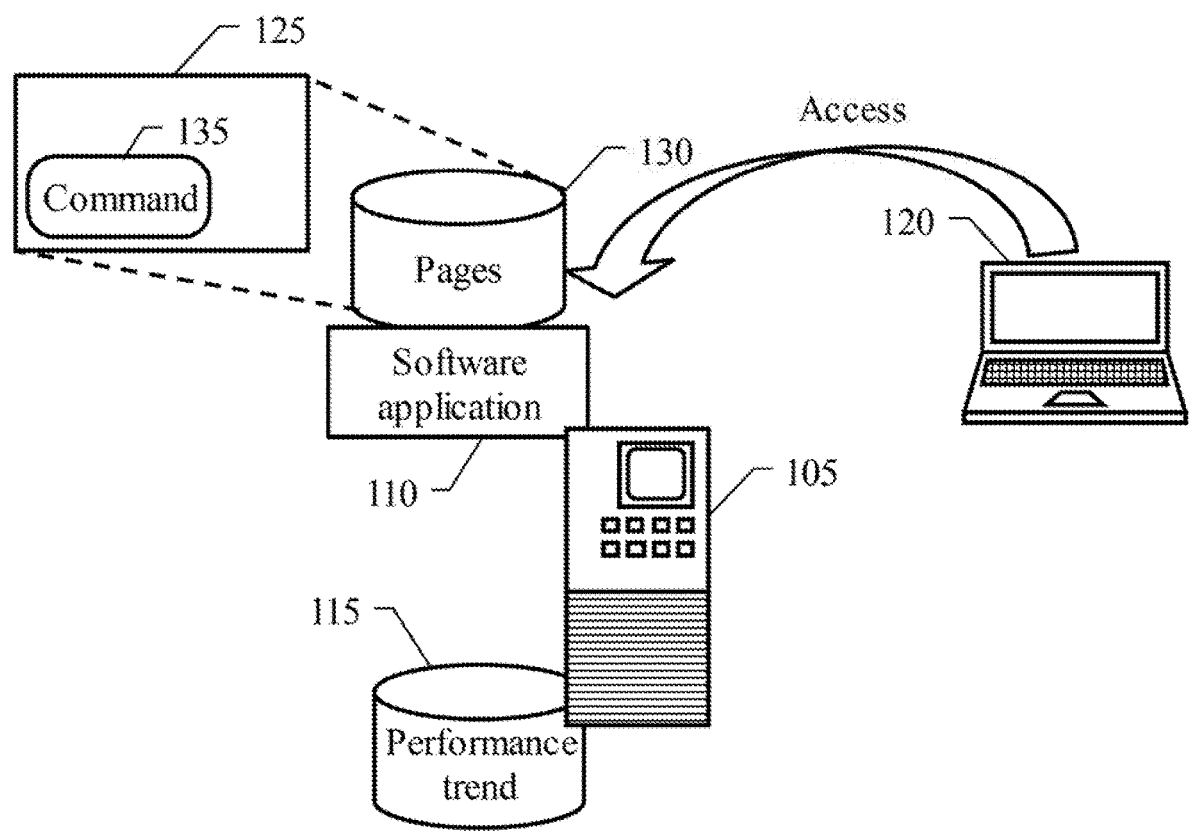

Moving to FIG. 1B, one or more client computing machines, or simply clients 120 (only one shown in the figure) may be used to access the software application 110 by users thereof. Particularly, each client 120 may be used to submit an access request for a user interface framework of the software application 110, for example, a (web) page 125. The page 125 may be part of a user interface 130 of the software application 110 (for example, a GUI), which user interface 130 allows the users of the clients 120 to interact with it. As far as relevant to the present disclosure, the page 125 comprises a command 135, or more (for example, a button) for submitting an operation request to the software application 110 (for example, a query to its databases).

Figure 1C:
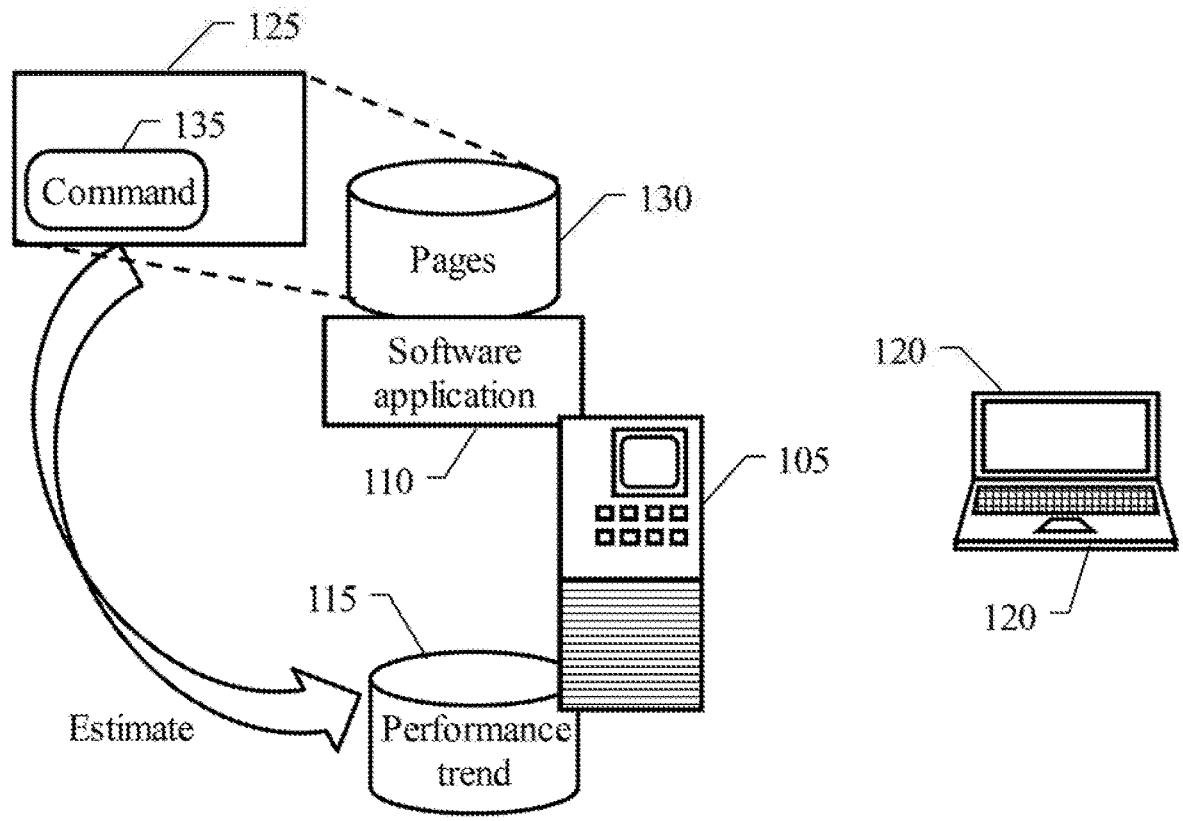

Moving to FIG. 1C, in response to the access request from the client 120, an (expected) response time may be estimated by the software application 110 for serving the operation request associated with the command 135. The expected response time may be estimated according to a comparison of one or more of the operative conditions corresponding to the operation request with the performance trend 115. For example, the expected response time is set to the value in the performance trend 115 for the operation type of the operation request, updated according to its variation in the performance trend 115 for a current time and/or a current workload of the software application 110 (such as by increasing/decreasing it in peak/idle conditions).

Figure 1D:
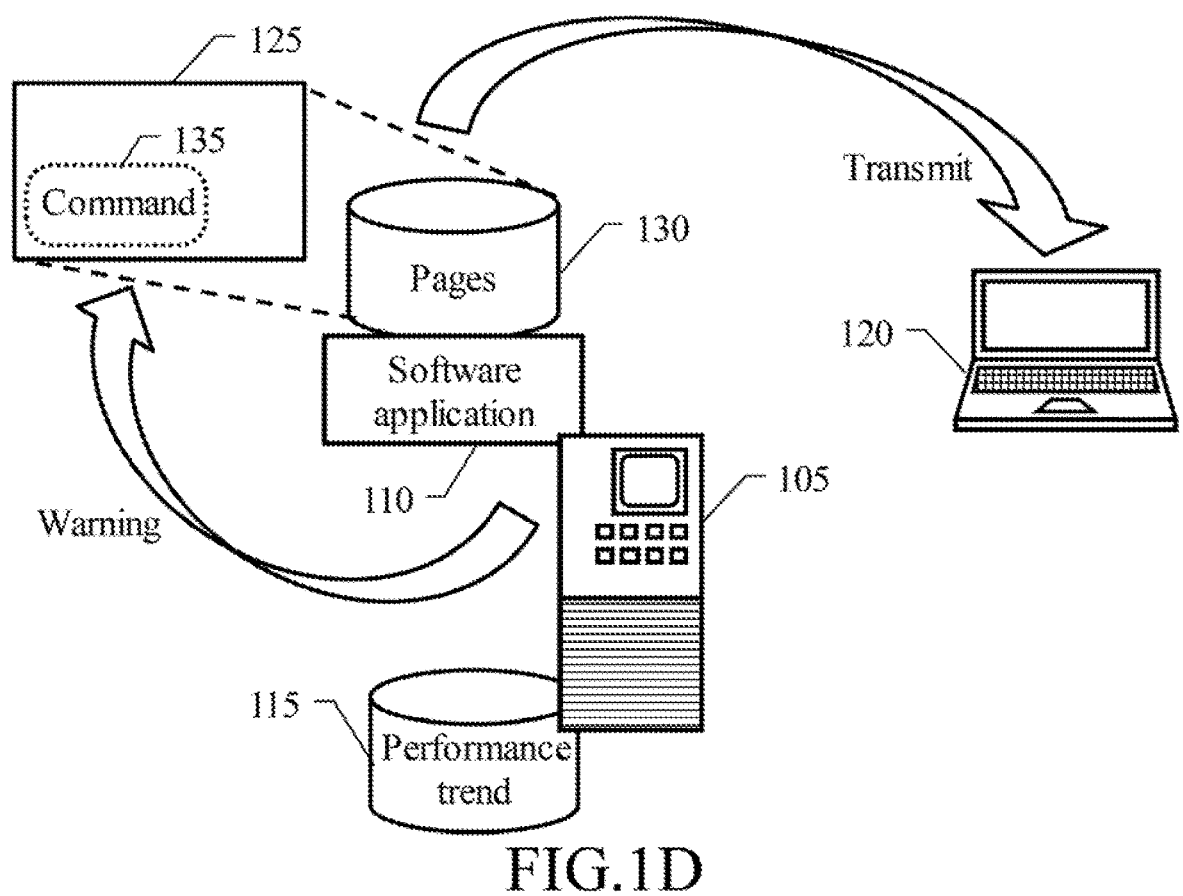

Moving to FIG. 1D, a performance artifact based on the expected response time may be transmitted to the client 120 in association with the page 125 that causes the client 120 to provide a warning according to the performance artifact in association with the command 135. For example, the expected response time is compared with a performance limit that has been previously set by the user of the client 120 (indicating its maximum acceptable value). Whenever the response time exceeds the performance limit (meaning that it is not acceptable for the user), the page 125 may be updated so that the command 135 is highlighted, the command 135 is disabled and/or a warning message may be displayed if the user selects the command 135 (before submitting the corresponding operation request to the server 105).

In this way, the users of the clients 120 may be informed of the expected response times of the command 135 in advance (before the corresponding operation requests are actually submitted to the server 105). Particularly, the users may know that the serving of specific operation requests is likely to be too long; therefore, the users are discouraged from submitting these operations requests (in any case, acting consciously accepting the corresponding delays) or they are prevented from doing it at all.

In the above-described solution, the expected response times of the operation requests may be estimated dynamically. Therefore, the corresponding warnings may be provided only when they are actually necessary according to contingent conditions. For example, the expected response times may be too long only in certain periods when many users are supposed to be using the software application 110 or they are actually doing it. In this way, the user interface 130 of the software application 110 self-adapts to the contingent conditions.

Figure 2:
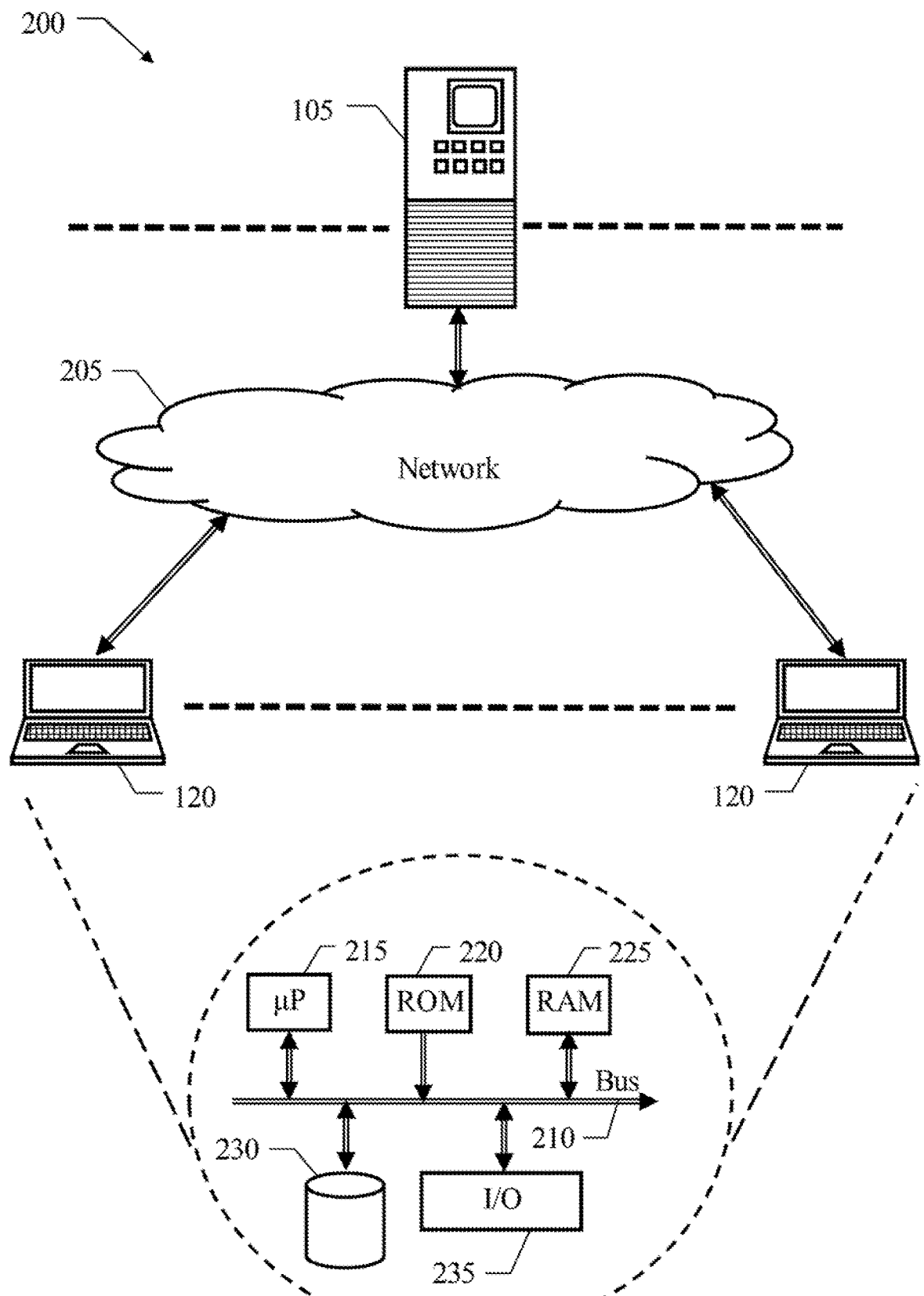
FIG. 2 shows a schematic block diagram of a computing system wherein the solution according to an embodiment of the present disclosure may be applied.

With reference now to FIG. 2, a schematic block diagram is shown of a computing system 200 wherein the solution according to an embodiment of the present disclosure may be applied.

The (computing) system 200 may be based on a client/server model, wherein the server 105 (or more) provides corresponding services to the clients 120. Typically, the system 200 has a distributed architecture with the server 105 and the clients 120 that communicate among them over a telecommunication network 205 (for example, based on the Internet).

Each of the above-described computing machines of the system 200 (i.e., the server 105 and the clients 120) comprises several units that are connected among them, for example, through a bus structure 210 with one or more levels. Particularly, one or more microprocessors (µP) 215 control operation of the computing machine 105,120. A non-volatile memory (ROM) 220 stores basic code for a bootstrap of the computing machine 105,120 and a volatile memory (RAM) 225 is used as a working memory by the microprocessors 215. The computing machine 115,120 is provided with a mass-memory 230 for storing programs and data (for example, storage devices of a server farm wherein the server 105 is implemented or a hard disk for the clients 120). Moreover, the computing machine 105,120 comprises a number of controllers 235 for peripheral, or Input/Output (I/O), units; for example, the peripheral units of the server 105 comprise a Network Interface Card (NIC) for communicating with a switch/router subsystem of the server farm providing access to the (telecommunication) network 205 and a drive for reading/writing removable storage units (such as optical disks, like DVDs) implemented by a console of the server farm, whereas each of the clients 120 comprises a monitor, a keyboard, a mouse, a Wireless NIC (WNIC) such as of the Wi-Fi type for accessing the network 205.

Figure 3:
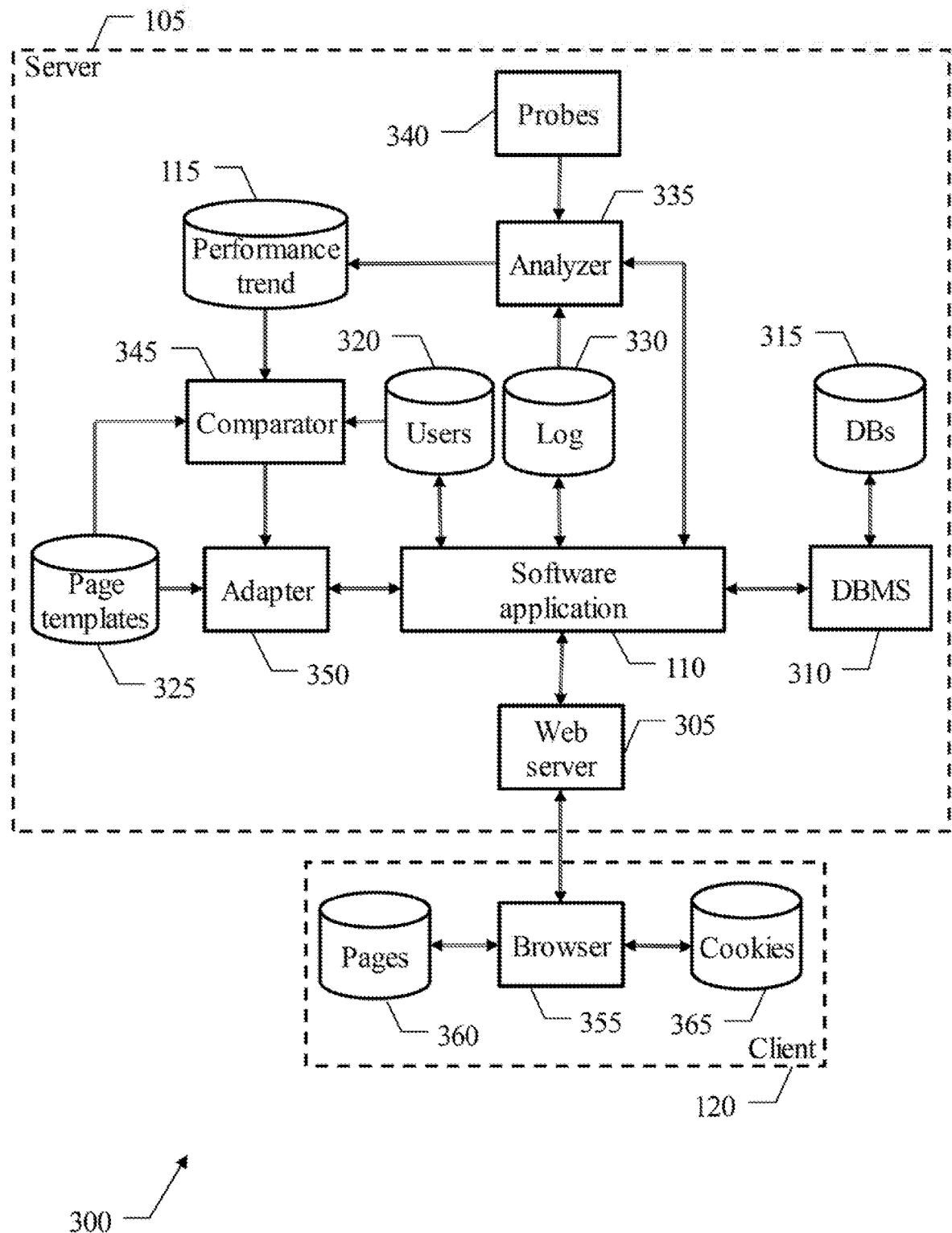
FIG. 3 shows the main software components that may be used to implement the solution according to an embodiment of the present disclosure.

With reference now to FIG. 3, the main software components are shown that may be used to implement the solution according to an embodiment of the present disclosure.

All the software components (programs and data) are denoted as a whole with the reference 300. The software components 300 are typically stored in the mass memory and loaded (at least partially) into the working memory of the server 105 and of each client 120 when the programs are running, together with an operating system and other application programs (not shown in the figure). The programs are initially installed into the mass memory, for example, from removable storage units or from the network. In this respect, each program may be a module, segment or portion of code, which comprises one or more executable instructions for implementing the specified logical function.

Starting from the server 105, it comprises the following components. A web server 305 may be used to process any requests that are submitted to the server 105 by the clients 120 (only one shown in the figure) accessing it. As far as relevant to the present disclosure, the web server 305 may interact with the software application 110. The software application 110 may exploit a Database Management System (DBMS) 310, which manages one or more databases 315 (for example, of relational type); in the example at issue, the databases 315 may be the most relevant component affecting the performance of the software application 110 (with the other processing operations performed by it that may be deemed negligible from this point of view). The software application 110 may access (in read/write mode) a user repository 320, which stores information about the users that are registered with the software application 110; as far as relevant to the present disclosure, the user repository 320 is used to save preferences of each (registered) user remotely, comprising his/her performance limit (for the comparison with the expected response times) and an indication of a (warning) type of the warnings to be provided when any expected response times exceed the performance limit (i.e., highlighted command, disabled command or displayed message). The user interface of the software application 110 may be defined by one or more pages, which are generated dynamically from corresponding (page) templates stored in a page template repository 325. Moreover, the software application 110 may access (in write mode) an operation request log 330, which stores information about the (logged) operation requests that have been submitted to the software application 110 in the past (for example, in the last 1-4 months); as far as relevant to the present disclosure, for each logged operation request the operation request log 330 comprises the corresponding (logged) query that has been submitted to the DBMS 310, a receiving time of the operation request from the corresponding client 120 and a dispatching time of a corresponding result to the client 120.

In the solution according to an embodiment of the present disclosure, an analyzer 335 may determine the performance trend of the software application 110. For this purpose, the analyzer 335 interacts with the software application 110 and it accesses (in read mode) the operation request log 330 for submitting (sample) operation requests to the software application 110 and collecting their (sample) response times and for retrieving the (actual) response times of the logged operation requests. Moreover, the analyzer 335 may exploit one or more probes 340 for detecting one or more environment parameters relating to an operative environment of the software application 110. For example, the probes 340 detect one or more hardware resources of the server 105 (such as processing power, working memory size, and storage access time), one or more software configurations of the software application 110 (such as priority, database location) and/or one or more data characteristics of the databases 315 (such as table sizes, indexing schema). The analyzer 335 may access (in write mode) a performance trend repository, which stores the (up-to-date) performance trend of the software application 110 (denoted with the same reference 115). For example, the performance trend indicates a baseline response time of the software application 110 that is expected for a baseline query (according to predefined performance guidelines depending on the environment parameters). The performance trend indicates the response times that are expected for one or more sample types of the sample operation requests, such as defined by selected tables, filtered fields and sorting criteria. The performance trend indicates the (average) response times that have been experienced (by the logged operation requests) for different time periods (such as every hour during the working days, every night and every weekend) and for different ranges of the number of concurrent users, or user ranges (such as with a pitch of 10-100 concurrent users). A comparator 345 estimates the expected response times of any operation requests that may be submitted to the software application 110 and compares them with the performance limits of the corresponding users. The comparator 345 may access (in read mode) the page template repository 325 (to determine the commands corresponding to the operation requests) and it may access (in read mode) the performance trend repository 115 and the user repository 320 (to estimate the expected response times and to compare them with the performance limits). The comparator 345 drives an adapter 350, which updates the page templates of the software application 110 to provide the required warnings in associating with their commands, when it is necessary; for this purpose, the comparator 350 is interposed between the page template repository 325 and the software application 110.

Moving to each client 120, it may be comprised from the following components. A browser 355 that may allow the user of the client 120 to surf the Internet; particularly, as far as relevant to the present disclosure, the browser 355 may be used to access the software application 110 through the web server 305. The browser 355 may access (in read/write mode) a page repository 360, which stores the pages that have been downloaded to the client 120 from the Internet, and particularly the ones of the user interface of the software application 110. Moreover, the browser 355 may access (in read/write mode) a cookies repository 365, which stores cookies generating while surfing the Internet; as far as relevant to the present disclosure, the cookies repository 365 may comprise one or more cookies of the software application 110 (identified by its URL) that are used (instead of the user repository 320) to store the preferences of the user locally when s/he is not registered with the software application 110.

Figure 4A:
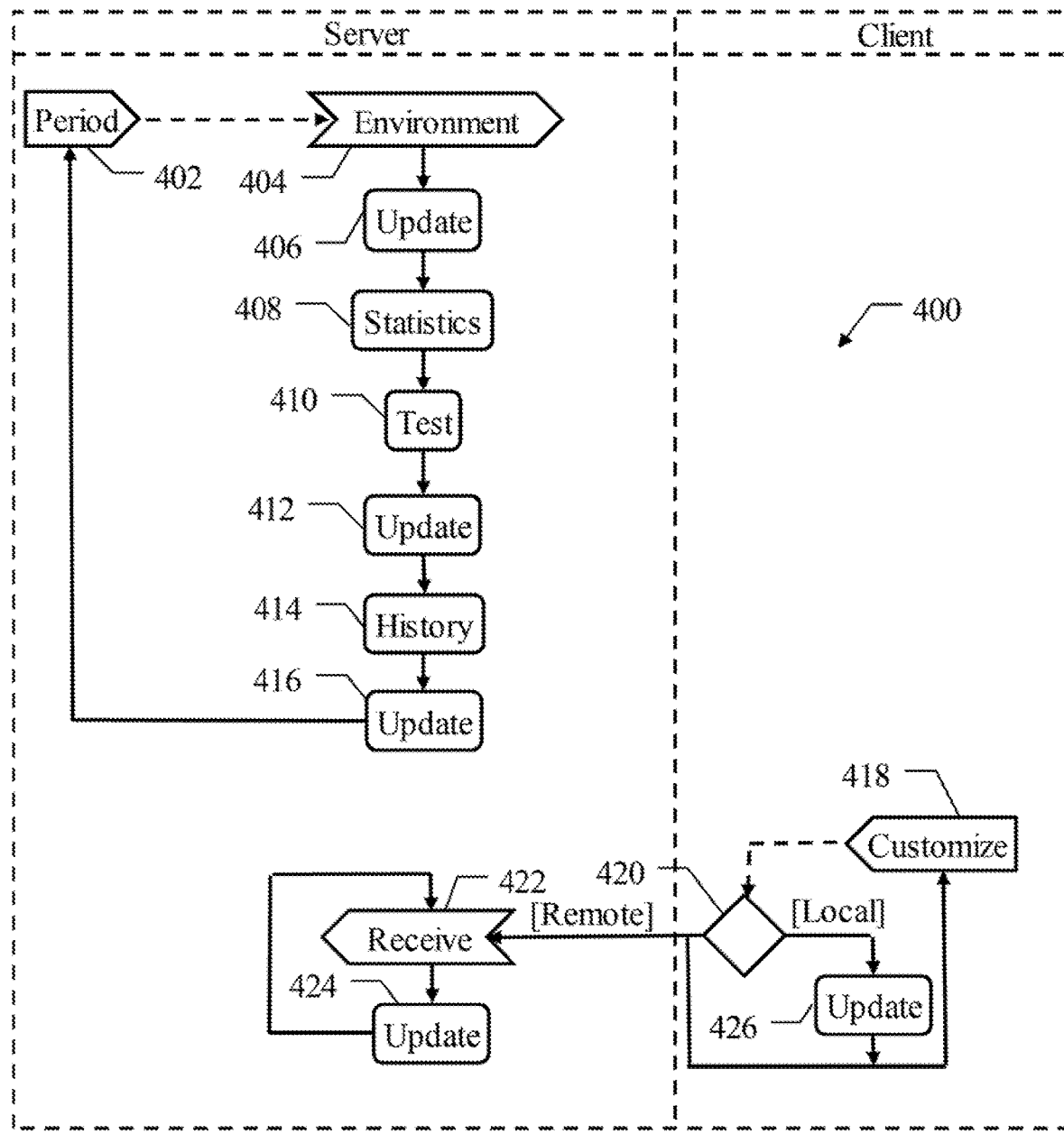
FIG. 4A-FIG. 4C show an activity diagram describing the flow of activities relating to an implementation of the solution according to an embodiment of the present disclosure.
Figure 4B:
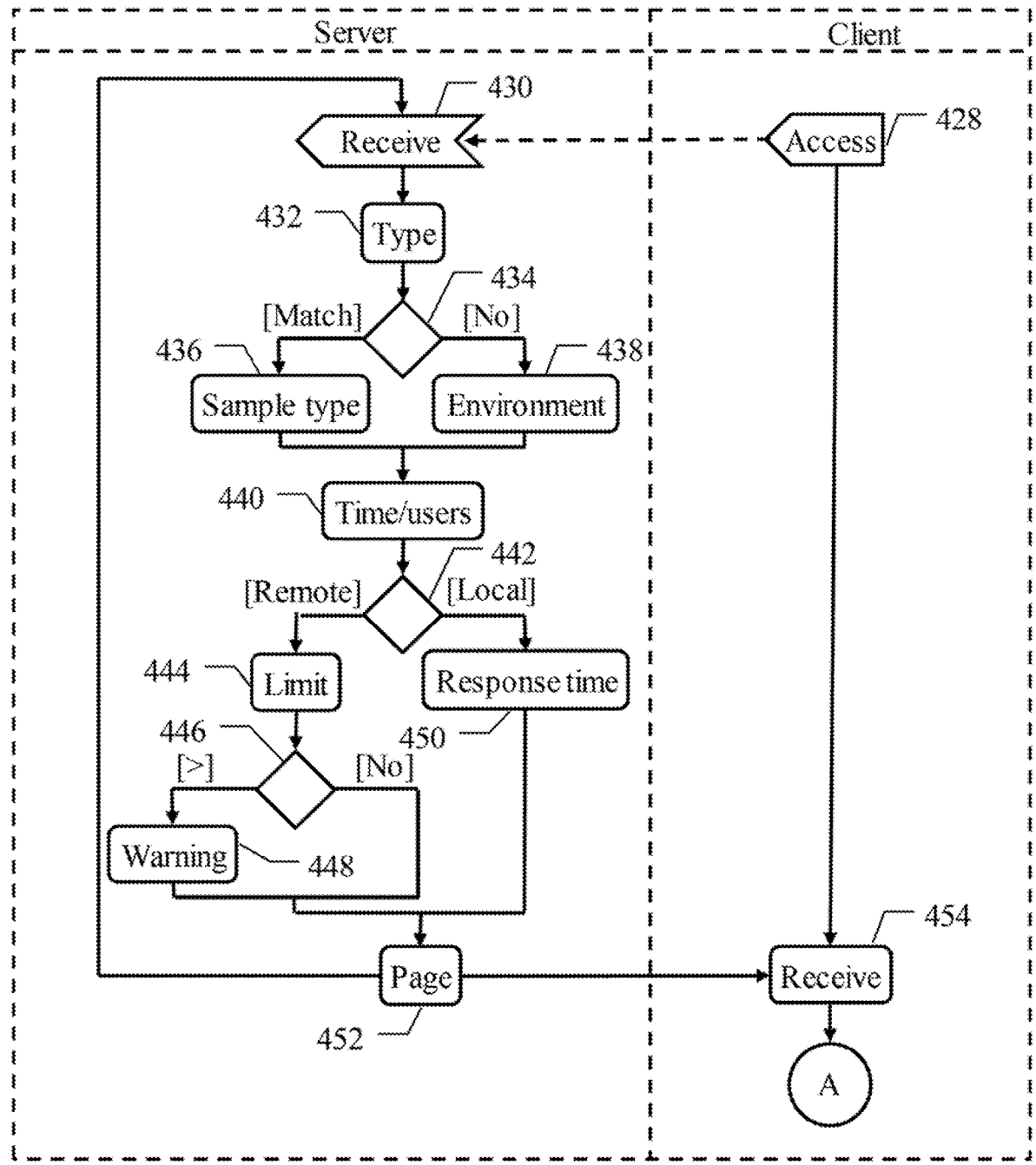
Figure 4C:
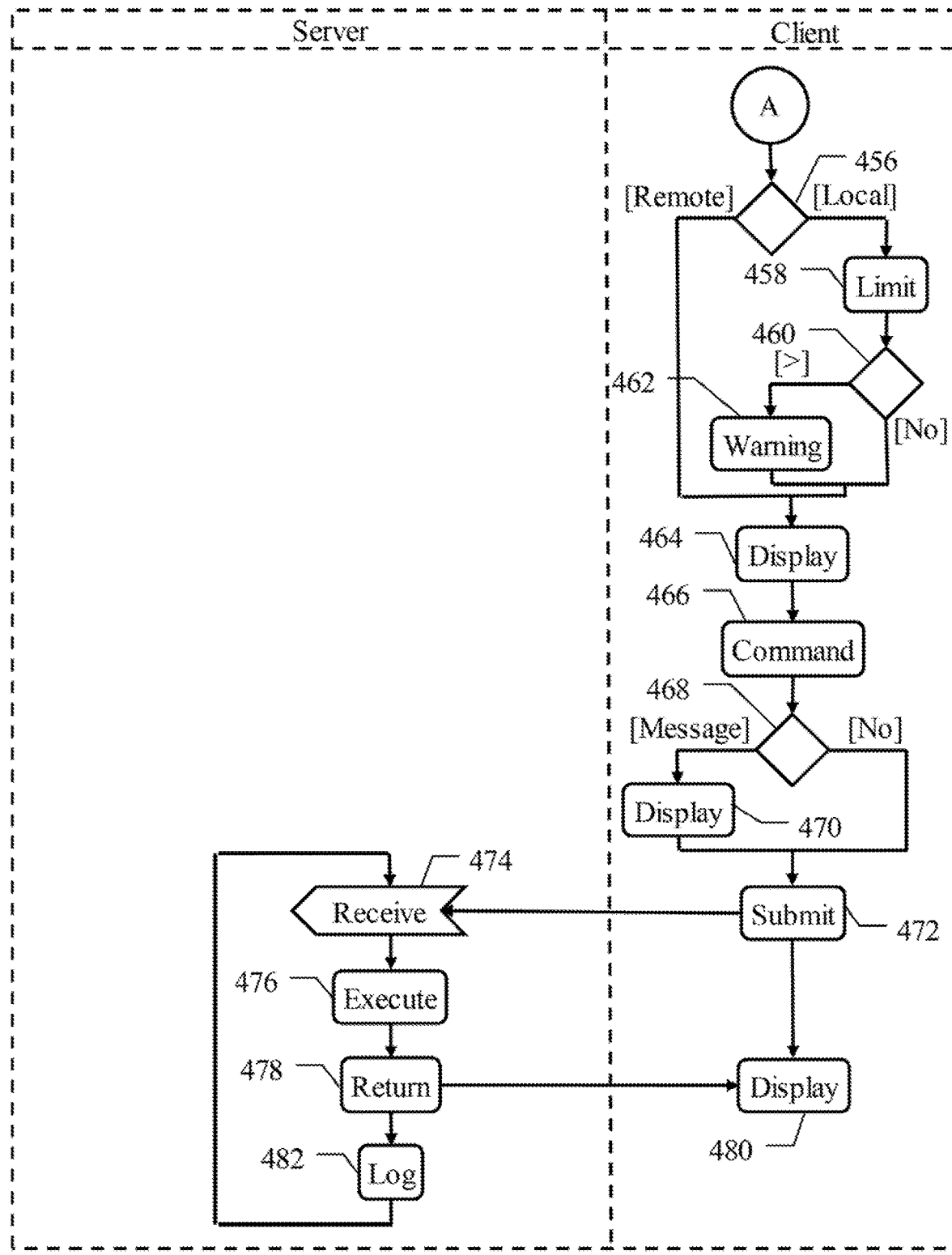

With reference now to FIG. 4A-FIG. 4C, an activity diagram is shown describing the flow of activities relating to an implementation of the solution according to an embodiment of the present disclosure.

Particularly, the diagram represents an exemplary process that may be used to access the software application with a method 400. In this respect, each block may correspond to one or more executable instructions for implementing the specified logical function on the corresponding computing machine (server or client).

Starting from the swim-lane of the server, the process passes from block 402 to block 404 every time a predefined period expires (for example, every night or weekend when the software application is substantially idle). In response thereto, the analyzer detects (the current values of) the environment parameters of the software application by means of the corresponding probes (i.e., its hardware resources, software configurations and data characteristics). Continuing to block 406, the analyzer calculates the baseline response time of the software application according to the environment parameters and the performance guidelines, and it updates the performance trend accordingly (in the corresponding repository), if it is necessary. Particularly, the performance guidelines indicate how the environment parameters are supposed to affect a benchmark response time of the software application (for the baseline query in standard conditions), such as increasing/decreasing it in percentage. For example, the performance guidelines may indicate minimum hardware resources that should be required as a function of one or more other environment parameters of the software application (for example, database size, number of concurrent user); moreover, the performance guidelines may indicate critical software configurations and critical data characteristics that should be avoided, either alone or in combination among them and with the minimum hardware resources (such as maximum database size, maximum number of concurrent users).

With reference now to 408, the analyzer performs a statistical analysis of the logged operation requests that have been submitted in the past to the software application (extracted from the corresponding log). Particularly, the analyzer may classify the logged operation requests into disjoint classes defining corresponding sample types according to their (logged) queries (for example, according to their selected tables, filtered fields and sorting criteria); the analyzer then may determine a frequency of each sample type (according to the number of the corresponding logged operation requests). The analyzer at block 410 tests the software application for the sample types, in decreasing order of their frequencies; the test continues for a predefined period (for example, the whole night or weekend) or until all the sample types have been taken into account. Particularly, for each (current) sample type, the analyzer may create a sample request comprising the execution of a corresponding sample query (for example, selecting the same tables, filtering the same fields with arbitrary values and sorting its result with the same criteria of the corresponding logged queries); the analyzer then may submit each sample request to the software application (in turn involving the execution of its sample query) and registers the corresponding sample response time (from the submission of the sample request to the receiving of the corresponding page). Continuing to block 412, the analyzer may update the performance trend (in the corresponding repository) according to the sample response times of the sample requests (for example, with time regression techniques).

With reference now to block 414, the analyzer determines the average response time of the software application for the (predefined) operation periods and user ranges according to the (actual) response times of the logged operation requests, calculated as a difference between their dispatching times and receiving times (extracted from the corresponding log). Continuing to block 416, the analyzer updates the performance trend (in the corresponding repository) according to the average response times of the operation periods and user ranges (for example, again with time regression techniques). The flow of activity then returns to the block 402 to repeat the same operations periodically.

Moving to the swim-lane of a generic client (only one shown in the figure), its user at block 418 may submit a (customization) request to the software application in the browser for customizing his/her preferences (after authenticating therewith if it is necessary); particularly, the user may update the performance limit and the warning type that are initialized to default values, such as 1-2 s and highlighted command, respectively. The flow of activity then branches at block 420 according to a configuration of the software application. Particularly, if the preferences of the (registered) user are saved remotely, the software application receives the customization request (through the web server listening for it) at block 422 in the swim-lane of the server. In response thereto, at block 424 the software application updates the user repository accordingly. The flow of activity then returns to the block 422 listening for a next customization request. Referring back to the block 420 in the swim-lane of the client, if instead the preferences of the user are saved locally, at block 426 the browser creates or updates the cookies of the software application accordingly. The flow of activity then returns from the block 426 or from the block 420 to the block 418 waiting for a next customization request.

In a completely independent way, at block 428 the user of the client may submit an access request to the software application in the browser for a page comprising a command for submitting an operation request thereto involving the execution of a corresponding query, or more (after authenticating therewith if it is necessary). The software application receives the access request (through the web server listening for it) at block 430 in the swim-lane of the server. In response thereto, at block 432 the comparator determines the operation type of the operation request (according to the selected tables, filtered fields and sorting criteria of the query as above). The comparator then verifies at block 434 whether the operation type matches one of the sample types (available in the performance trend repository). If so, at block 436 the comparator initializes the expected response time of the operation request to the sample response time of the corresponding sample type (extracted from the performance trend repository). Conversely, at block 438 the comparator initializes the expected response time of the operation request to the baseline response time of the software application (extracted from the performance trend repository as well). In this way, the expected response time is determined according to the actual conditions of the software application defined by its test with the sample requests when it is possible (so as to provide a high accuracy) or it is determined according to the performance guidelines applied to the environment parameters of the software application otherwise (so as to provide an acceptable accuracy in any case, irrespectively of the fact that the test of the software application is intrinsically incomplete since the possible operation types are infinite).

In both cases, the flow of activity merges again at block 440 (from the block 436 or the block 438) wherein the comparator updates the expected response time as a function of a current time (for example, provided by a system clock) and/or of a current number of concurrent users of the software application (according to the performance trend in the corresponding repository); for example, the expected response time is increased/decreased in percentage when the average response time of the software application for the current time and/or the current number of concurrent users is high/low. In this way, the expected response time is estimated dynamically according to the contingent conditions (for example, with the expected response time that may change during the day, the week).

The flow of activity then branches at block 442 according to the configuration of the software application. Particularly, if the preferences of the (registered) user are saved remotely the blocks 444-448 are executed, whereas if the preferences of the user are saved locally the block 450 is executed; in both cases, the process then merges again at block 452. With reference in particular to the block 444 (preferences of the user saved remotely), the comparator retrieves the performance limit and the warning type of the user from the corresponding repository. The comparator at block 446 then compares the expected response time with the performance limit. If the expected response time is (possibly strictly) higher than the performance limit, the adapter at block 448 updates the page template corresponding to the operation request (extracted from the corresponding repository) by adding a warning in association with its command (of the warning type of the user). For example, the adapter highlights the command (such as in a color different from a standard one) to indicate that the serving of the operation request is likely to be too slow, disables the command (such as by graying-out it) to prevent the user from submitting the operation request or injects a script to cause the display of a warning message when the command is selected (such as in a pop-up window) requiring the user to confirm the submission of the operation request despite its serving is likely to be too slow. In this way, the operation of the software application is tailored individually to the preferences of each user, according to a personal level of responsiveness (and of warning type) that is desired (for example, with the same operation request that may be too slow for a user requiring high dynamicity but not for another user working more calmly). Optionally, the adapter may also send an alarm message (for example, via e-mail or SMS) to a system administrator (for example, in response to one or more warnings for the same operation type) with the indication of a corresponding problem and a possible cause thereof; for example, the adapter may infer the cause of the problem according to the above-mentioned operations performed to determine the response time of the operation request (such as when it may identify deficient hardware resources, unsuitable software configurations, excessive data characteristics and/or too many concurrent users). The process then descends into block 452; the same point is also reached directly from the block 446 if the expected response time is not (possibly strictly) higher than the performance limit (so as to leave the page template unaffected). With reference instead to the block 450 (preferences of the user saved locally), the comparator always updates the page template by adding the response time of the operation request in association with the command (for example, in a corresponding field) and by injecting a script for comparing it with the performance limit of the user. In this case as well, the process then descends into block 452. With reference now to block 452, the software application receives the page template (possibly updated) from the adapter and generates the corresponding page as usual; at this point, the software application returns the page to the client (through the web server); the flow of activity then returns to the block 430 listening for a next access request. Therefore, the above-described solution is of general applicability to any software applications (without any need of specifically instrumenting them).

Referring back to the swim-lane of the client, the browser at block 454 receives the page from the web server (being listening for it from the block 428). The flow of activity then branches at block 456 according to the configuration of the software application. Particularly, if the preferences of the user are saved locally the browser at block 458 launches the script injected into the page. The script retrieves the performance limit and the warning type of the user from the cookies of the software application (in the corresponding repository). The script at block 460 then compares the expected response time of the operation request (retrieved from the corresponding field) with the performance limit. If the expected response time of the operation request is (possibly strictly) higher than the performance limit, the script at block 462 updates the page by adding the corresponding warning (of the warning type of the user). As above, the script highlights the command, disables the command or enables a script to cause the display of the warning message when the command is selected (optionally, with the possibility of sending an alarm message to the system administrator). The process then descends into block 464; the same point is also reached directly from the block 460 if the expected response time of the operation request is not (possibly strictly) higher than the performance limit (so as to leave the page unaffected) or from the block 456 if the preferences of the user are saved remotely (and then the page has already been updated on the server if it is necessary). With reference now to block 464, the browser displays the page (possibly updated) on the monitor of the client; as a result, if the serving of the operation request is likely to be too slow the corresponding command may be highlighted or disabled, according to the preferences of the user.

Assuming that the user selects the command in the page (if it is possible), the process continues to block 466. In response thereto, the flow of activity branches at block 468. Particularly, if a script for displaying the warning message is associated with the command in the page, the browser launches this script that displays the warning message on the monitor. Assuming that the user confirms the submission of the operation request (despite the warning message), the process descends into block 472; the same point is also reached directly from the block 468 (without performing any action) if no script for displaying any warning message is associated with the command in the page. In both cases, the browser now submits the operation request associated with the command to the server as usual.

The software application receives the operation request (through the web server listening for it) at block 474 in the swim-lane of the server. In response thereto, at block 476 the software application executes the operations required to serve the operation request, comprising running the corresponding query onto the databases. The software application retrieves a required (further) page template (from the corresponding repository) and generates a corresponding (further) page according to the result of the query. Continuing to block 478, the software application returns this page to the client (through the web server). Referring back to the swim-lane of the client, the browser at block 480 receives the page from the web server (being listening for it from the block 472) and then displays it onto the monitor (with the process that then continues according to the choice of the user). At the same time, in the swim-lane of the server the process descends into block 482 (from the block 478) wherein the software application adds a record for the operation request to the corresponding log (with the indication of its query, receiving time and dispatching time); the flow of activity then returns to the block 474 listening for a next operation request.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, each numerical value should be read as modified by the term about (unless already done) and each range of numerical values should be intended as expressly specifying any possible number along the continuum within the range (comprising its end points). Moreover, ordinal or other qualifiers are merely used as labels to distinguish elements with the same name but do not by themselves connote any priority, precedence or order. The terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for accessing a software application. However, the software application may be of any type (for example, interacting with databases, middleware programs, and other software applications or even stand-alone).

In an embodiment, the software application runs on a server computing machine. However, the server computing may be of any type (see below).

In an embodiment, the software application is accessed from one or more client computing machines. However, the client computing machines may be in any number and of any type (see below).

In an embodiment, the method comprises determining a performance trend of the software application. However, the performance trend may be determined in any way (for example, according to environment parameters, sample requests, logged operation requests or any combination thereof).

In an embodiment, the performance trend models one or more performance indicators of the software application as a function of one or more operative conditions thereof. However, the performance indicators may be in any number and of any type (for example, response time, processing speed) and likewise the operative conditions may be in any number and of any type (for example, defined by environment parameters, operation types, times, workloads); moreover, the performance trend may model the performance indicators as a function of the operative conditions in any way (for example, with tables, functions, rules, knowledge bases, trained neural networks).

In an embodiment, the method comprises receiving corresponding access requests from the client computing machines for a user interface framework of the software application. However, the access requests may be submitted in any way (for example, by opening a page, selecting a hyperlink, with or without the need for the user to authenticate with the software application); moreover, the user interface framework may be of any type (for example, a page, a window, a frame, a command line).

In an embodiment, the user interface framework comprises at least one command for submitting corresponding operation requests to the software application. However, the user interface framework may comprise any number and type of commands (for example, button, hyperlinks, menu entries or any other user interface element); moreover, the command is for submitting any operation request to the software application (for example, involving the execution of queries, collection of information, processing of data).

In an embodiment, the method comprises estimating corresponding expected response times of the software application for serving the operation requests in response to the access requests. However, the expected response times may be estimated in any way (for example, with algorithms, neural networks).

In an embodiment, the expected response time of each of the operation requests is estimated according to a comparison of one or more of the operative conditions corresponding to the operation request with the performance trend. However, the expected response time may be estimated in any way (for example, according to the environment parameters, the operation type of the operation request, the current time, the current workload of the software application or any combination thereof).

In an embodiment, the method comprises transmitting corresponding performance artifacts based on the expected response times in association with the user interface framework to the client computing machines. However, the performance artifacts may be of any type (for example, information and/or scripts indicating the corresponding warnings only when it is necessary, the expected response times always, flags merely indicating the results of the comparisons of the expected response times with the performance limits) and they may be transmitted in any way (for example, embedded in the user interface framework or separately).

In an embodiment, the transmission of the performance artifacts causes the client computing machines to provide corresponding warnings according thereto in association with the command. However, the warnings may be of any type (for example, highlighted commands, disabled commands, warning messages or any combination thereof).

In an embodiment, the software application interacts with one or more databases. However, the databases may be in any number and of any type (for example, relational databases, and object-oriented databases being available either locally or remotely).

In an embodiment, each of the operation requests involves the execution of one or more queries on the databases. However, the queries may be in any number and of any type (for example, for selecting, inserting, appending, creating data, filtering any number of single or joined fields, sorting the results with any number and type of criteria).

In an embodiment, said estimating corresponding expected response times comprises estimating each of the expected response times according to a comparison of an operation type of the corresponding operation request with the performance trend. However, the operation type may be defined in any way (for example, according to the selected tables, the filtered fields, the sorting criteria or any combination thereof); moreover, the expected response time may be estimated according to the operation type in any way (for example, setting it to the sample response time of a sample type matching its operation type as is or with a scaling factor depending on additional factors, such as a corresponding processing complexity).

In an embodiment, said step of estimating corresponding expected response times comprises estimating each of the expected response times according to a comparison of corresponding current times with the performance trend. However, the times may be defined in any way (for example, according to time periods of any duration or continually) and the current time may be detected in any way (for example, at the estimation of the expected response time, at the receipt/submission of the access request); moreover, the expected response time may be estimated according to the current time in any way (for example, updating its value initialized in another way accordingly, determining it directly).

In an embodiment, said step of estimating corresponding expected response times comprises estimating each of the expected response times according to a comparison of a corresponding current workload of the software application with the performance trend. However, the workload may be defined in any way (for example, according to the number of concurrent users, number and type of submitted operation requests, network traffic or any combination thereof); moreover, the expected response time may be estimated according to the current workload in any way (for example, updating its value initialized in another way accordingly, determining it directly).

In an embodiment, said step of determining a performance trend comprises detecting one or more environment parameters of the software application. However, the environment parameters may be in any number and of any type (for example, indicative of any hardware resources, software configurations and/or data characteristics); moreover, the environment parameters may be detected in any way (for example, verifying them periodically, receiving notifications for any changes thereof, submitting one or more benchmark requests to measure a responsiveness of the software application).

In an embodiment, said step of determining a performance trend comprises determining the performance trend according to the environment parameters. However, the performance trend may be determined in any way according to the performance parameters (for example, on the basis of any number and type of guidelines, rules, formulas, in terms of a generic baseline response time, multiple baseline response times for corresponding operative conditions).

In an embodiment, said step of determining a performance trend comprises submitting one or more sample requests to the software application. However, the sample requests may be in any number and of any type (for example, entire operation requests, mere queries, determined according to a statistical analysis of the logged operating requests, predefined, limited to user interface frameworks supposed to be slow according to other criteria).

In an embodiment, said determining a performance trend comprises determining the performance trend according to corresponding sample response times for serving the sample requests. However, the sample response times may be of any type (for example, for serving the sample requests entirely, for executing the corresponding queries only, either as is or multiplied by an adjustment factor accounting for any required further processing) and they may be used in any way for determining the performance trend (for example, according to time regressions techniques, simply taking into account every last test of the software application only).

In an embodiment, the method comprises logging the operation requests that are submitted to the software application by the client computing machines. However, the operation requests may be logged in any way (for example, individually or collectively at the level of aggregated information thereof, such as the average response times of their operation types).

In an embodiment, the method comprises determining the sample requests according to the operation requests that are logged. However, the sample requests may be determined in any way according to the logged operation requests (for example, according to their frequencies over any period, in a number as higher as possible according to the available time for testing the software application, in a predetermined number or only for frequencies above a threshold).

In an embodiment, said step of estimating corresponding expected response times comprises estimating the expected response time of each of the operation requests according to the performance trend corresponding to one of the sample requests matching the operation request if available or according to the performance trend based on the environment parameters otherwise. However, the expected response time may be estimated in any way according to the sample requests and the environment parameters (for example, alternatively, always starting from the environment parameters and superseding/updating the obtained value according to the sample requests if it is possible).

In an embodiment, the method comprises logging the operation requests being submitted to the software application by the client computing machines in association with an indication of corresponding actual response times. However, the operation requests may be logged in any way (either the same as or different from above) and the corresponding actual response times may be associated therewith in any way (for example, by saving their receiving times/dispatching times or any other relevant times, such as the start times/end times of the corresponding queries, directly their actual response times calculated from these values).

In an embodiment, the method comprises determining the performance trend according to the actual response times of the operation requests that are logged. However, the performance trend may be determined in any way according to the logged operation requests (for example, over any period according to time regressions techniques, simply taking into account the most recent information).

In an embodiment, the method comprises receiving corresponding performance limits for one or more users of the client computing machines. However, the performance limits may be of any type (for example, single thresholds or multiple thresholds for different severities) and they may be received in any way (for example, with or without the possibility of customizing them by the users).

In an embodiment, the method comprises determining the warnings for each of the users according to a comparison of the corresponding expected response times with the performance limit of the user. However, the warnings may be determined according to any comparison of the expected response times with the performance limit (for example, determining that the serving of each operation request is simply too slow or grading the corresponding delay with respect to the performance limit); in any case, the possibility is not excluded of basing the warnings on the expected response times only (for example, simply grading their values) without the comparison with any performance limit.

In an embodiment, the method comprises transmitting the performance artifacts to the corresponding client computing machines to cause each of the client computing machines to perform the following operations. However, different, additional or alternative operations are possible (for example, with or without transmitting the alarm messages to the system administrator, suggesting possible better times for submitting the operation requests to the user).

In an embodiment, these operations comprise displaying the command in the user interface framework with a visual clue according to the corresponding expected response time. However, the visual clue may be of any type (for example, color, graphical effect) and it may depend on the expected response time in any way (for example, a single clue different from the standard one when the expected response time exceeds a single threshold, a gradation of different visual clues, such as colors from light to dark, when the expected response time exceeds corresponding thresholds).

In an embodiment, these operations comprise disabling the command in the user interface framework according to the corresponding expected response time. However, the command may be disabled in any way (for example, by graying-out, removing it).

In an embodiment, these operations comprise displaying a warning message according to the corresponding expected response time in response to a selection of the command, before submitting the operation request to the server computing machine. However, the warning message may be displayed in any way (for example, in a pop-up window, a pull-down menu).

In an embodiment, said step of transmitting corresponding performance artifacts comprises updating the user interface framework for the client computing machines according to the corresponding warnings. However, the user interface framework may be updated in any way (for example, completely on the server, by adding fields and/or injecting scripts for updating it on the clients).

In an embodiment, said step of transmitting corresponding performance artifacts comprises returning the user interface framework that is updated according to the corresponding warnings to the client computing machines to cause the client computing machines to display the user interface framework (updated according to the corresponding warnings). However, the user interface framework may be displayed as updated according to the warnings in any way (for example, directly as is or processed locally).

Generally, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

An embodiment provides a computer program configured for causing a computing system to perform the above-mentioned method. An embodiment provides a computer program product comprising a computer readable storage medium having program instructions embodied therewith, the program instructions executable by a computing system to cause the computing system to perform the same method. However, the computer program may run completely on the server or in part on each client as well (for example, receiving the expected response times and determining the warnings according to the performance limit and the warning type, receiving a flag indicating the warnings and determining them according to the warning type). Moreover, the software program may be implemented as a stand-alone module, as a plug-in for a pre-existing software program (for example, the software application) or even directly in the latter. In any case, the solution according to an embodiment of the present invention lends itself to be implemented even with a hardware structure (for example, by electronic circuits integrated in one or more chips of semiconductor material), or with a combination of software and hardware suitably programmed or otherwise configured.

An embodiment provides a system comprising means configured for performing the steps of the above-mentioned method. An embodiment provides a system comprising a circuitry (i.e., any hardware suitably configured, for example, by software) for performing each step of the same method. Particularly, the method may be performed entirely on the server or in part on each client as well (see above). However, the server and each client may be of any type (for example, a physical computing machine, a virtual computing machine, a cloud service for the server and a desktop, a laptop, a smartphone, a tablet for the client) and the whole system may comprise any number of servers and clients communicating among them via any network (for example, of local, wide area, global, cellular or satellite type).

Generally, similar considerations apply if the server, the clients and the whole system each has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some a460-494rnative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The above-described features may be combined in any way. For example, possible combination of features described above may be the following: claim 2 with claim 1, claim 3 with claim 1 or 2, claim 4 with any claim from 1 to 3, claim 5 with any claim from 1 to 4, claim 6 with any claim from 1 to 5, claim 7 with any claim from 1 to 6, claim 8 with claim 7, claim 9 with any claim from 7 or 8, claim 10 with any claim from 1 to 9, claim 11 with any claim from 1 to 10, claim 12 with any claim from 1 to 11, claim 13 with any claim from 1 to 12, claim 14 with instructions for performing the method of any claim from 1 to 13, claim 15 with means (or a circuitry) for performing each step of any claim from 1 to 13.

Figure 5:
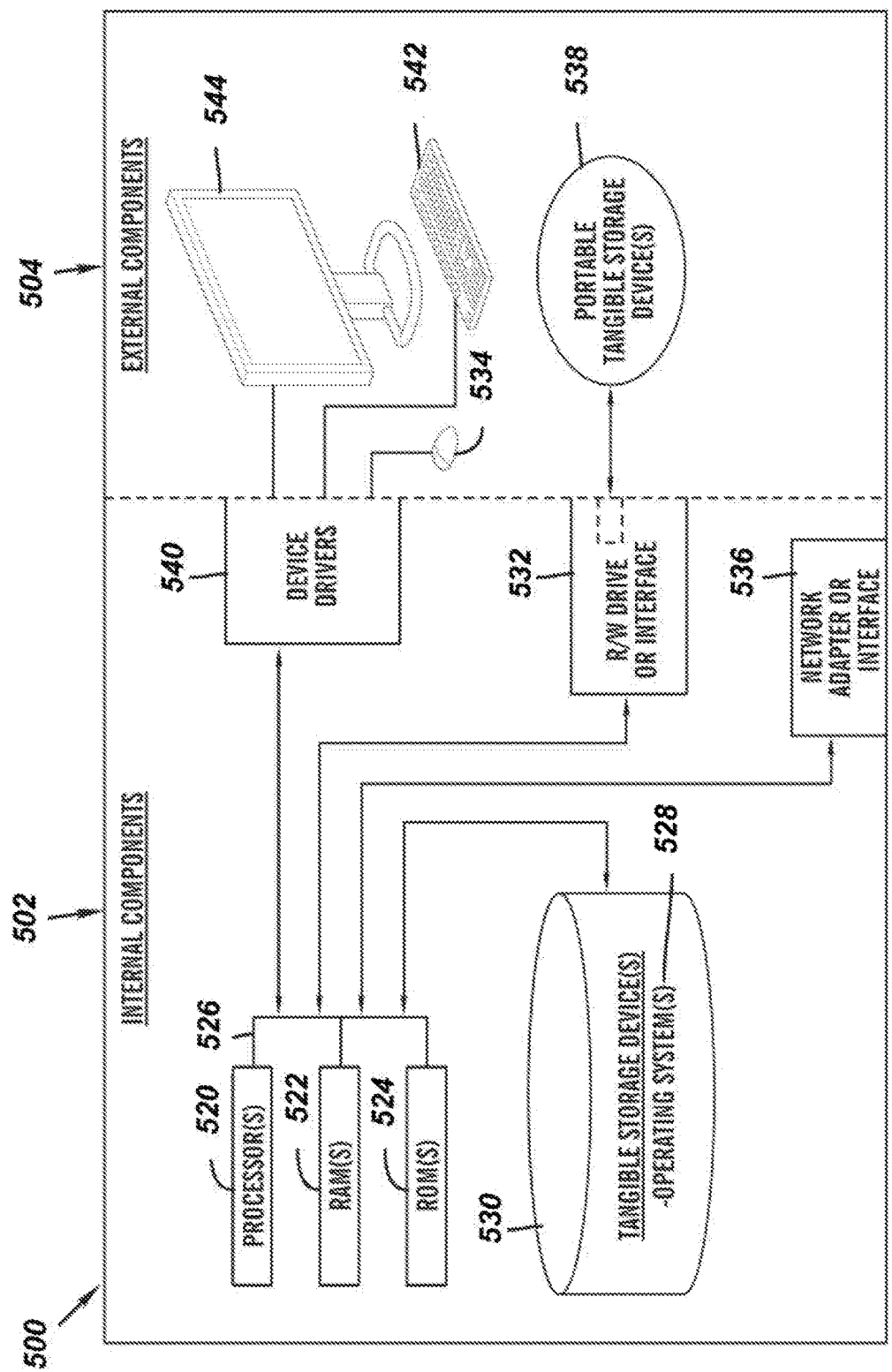
FIG. 5 is a block diagram of internal and external components of computers and servers depicted in FIG. 1 according to at least one embodiment.

FIG. 5 is a block diagram 500 of internal and external components of the server 105 and the clients 120 depicted in FIG. 1A-FIG. 1D in accordance with an embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

The data processing system 502, 504 is representative of any electronic device capable of executing machine-readable program instructions. The data processing system 502, 504 may be representative of a smart phone, a computer system, PDA, or other electronic devices. Examples of computing systems, environments, and/or configurations that may represented by the data processing system 502, 504 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The server 105 and the clients 120 may include respective sets of internal components 502*a,b* and external components 504*a,b* illustrated in FIG. 5. Each of the sets of internal components 502 include one or more processors 520, one or more computer-readable RAMs 522, and one or more computer-readable ROMs 524 on one or more buses 526, and one or more operating systems 528 and one or more computer-readable tangible storage devices 530. The one or more operating systems 528, the software application 110 and the software components 300 are stored on one or more of the respective computer-readable tangible storage devices 530 for execution by one or more of the respective processors 520 via one or more of the respective RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

Each set of internal components 502a,b also includes a R/W drive or interface 532 to read from and write to one or more portable computer-readable tangible storage devices 538 such as a CD-ROM, DVD, memory stick, magnetic tape, magnetic disk, optical disk or semiconductor storage device. A software component, such as the software application 110 and the software components 300, can be stored on one or more of the respective portable computer-readable tangible storage devices 538, read via the respective R/W drive or interface 532, and loaded into the respective hard drive 530.

Each set of internal components 502a,b also includes network adapters or interfaces 536 such as a TCP/IP adapter cards, wireless Wi-Fi interface cards, or 3G or 4G wireless interface cards or other wired or wireless communication links. The software application 110 and the software components 300 in the server 105 can be downloaded to the clients 120 and the server 105 from an external computer via a network (for example, the Internet, a local area network or other, wide area network) and respective network adapters or interfaces 536. From the network adapters or interfaces 536, the software application 110 and the software components 300 may be loaded into the respective hard drive 530. The network may comprise copper wires, optical fibers, wireless transmission, routers, firewalls, switches, gateway computers and/or edge servers.

Each of the sets of external components 504a,b can include a computer display monitor 544, a keyboard 542, and a computer mouse 534. External components 504a,b can also include touch screens, virtual keyboards, touch pads, pointing devices, and other human interface devices. Each of the sets of internal components 502a,b also includes device drivers 540 to interface to computer display monitor 544, keyboard 542, and computer mouse 534. The device drivers 540, R/W drive or interface 532, and network adapter or interface 536 comprise hardware and software (stored in storage device 530 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.
Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.
Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).
Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
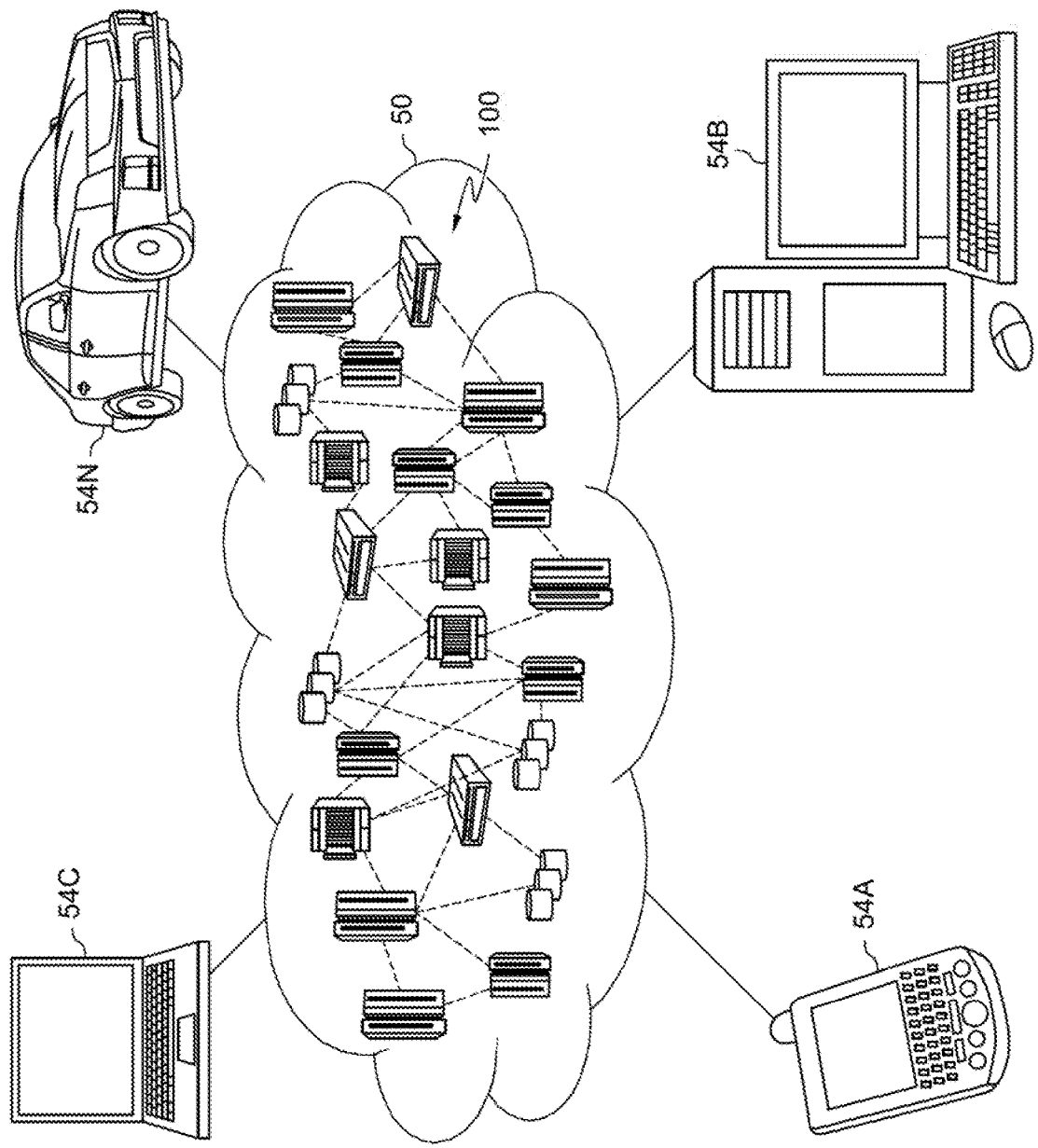
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 100 and cloud computing environment 50 can communicate with any type of computerized device over any type of network and/or network addressable connection (e.g., using a web browser).

Figure 7:
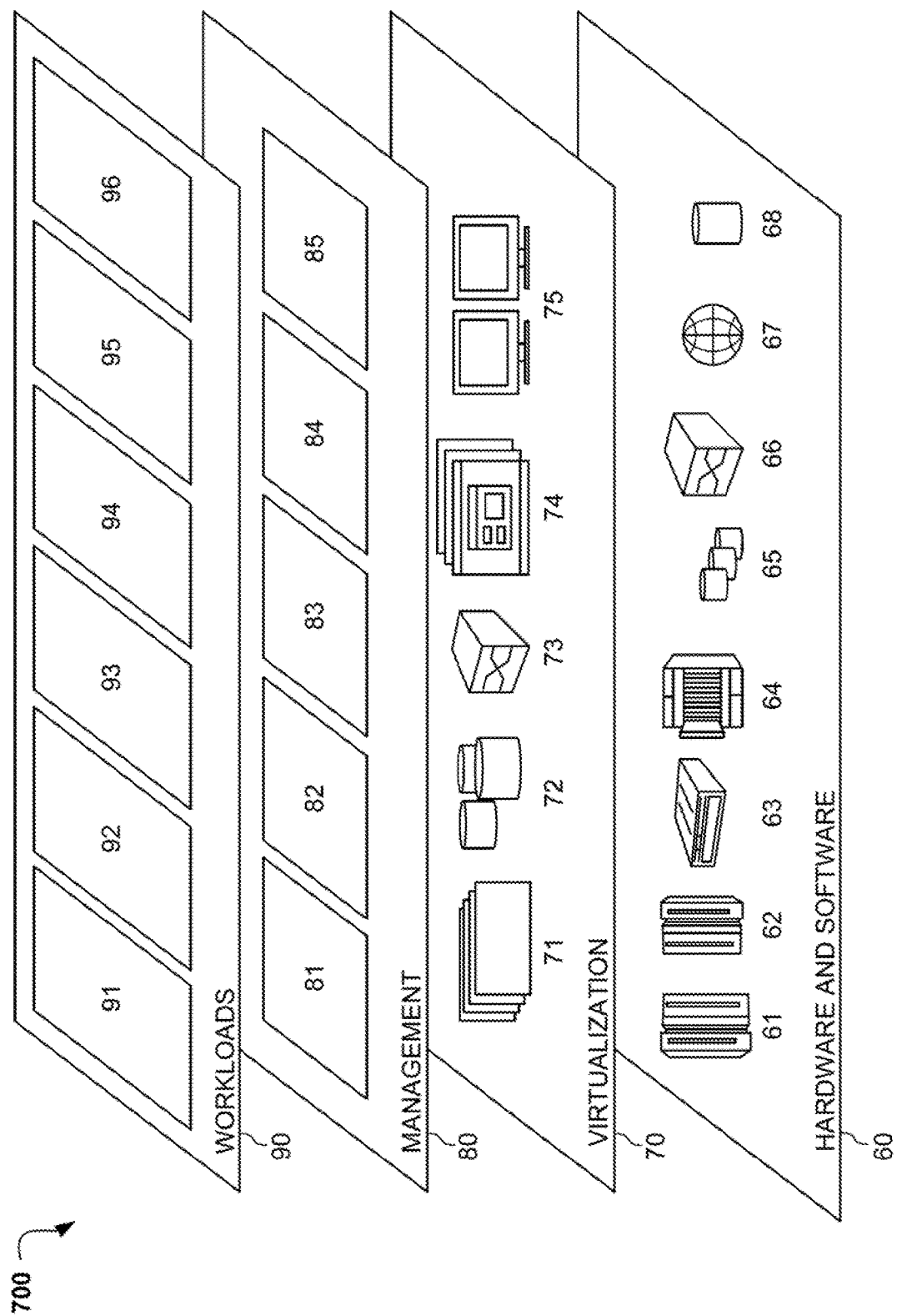
FIG. 7 depicts abstraction model layers according to an embodiment of the present invention.

Referring now to FIG. 7, a set of functional abstraction layers 700 provided by cloud computing environment 50 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and user interface with expected response times of commands 96. User interface with expected response times of commands 96 may relate to a method for accessing a software application, wherein in response to a request for a user interface framework of the software application, corresponding expected response times of the software application for serving the operation requests are estimated according to a performance trend of the software application, where expected response times may then be used to provide corresponding warnings according to the command.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for estimating expected response times, wherein the method comprises:
   determining, by the server computing machine, a performance trend of a software application, wherein the software application interacts with one or more databases and each of the operation requests involves an execution of one or more queries on the one or more databases, and wherein the performance trend models one or more performance indicators of the software application as a function of one or more operative conditions;
   receiving corresponding access requests from a one or more client computing machines for a user interface framework of the software application;
   estimating corresponding expected response times of the software application for serving the operation requests in response to the access requests; and
   transmitting corresponding performance artifacts based on the expected response times in association with the user interface framework to the one or more client computing machines to cause the one or more client computing machines to provide corresponding warnings.

2. The method according to claim 1, wherein said estimating corresponding expected response times comprises estimating each of the expected response times according to a comparison of an operation type of the corresponding operation request with the performance trend.

3. The method according to claim 1, wherein said estimating corresponding expected response times comprises estimating each of the expected response times according to a comparison of a corresponding current time with the performance trend.

4. The method according to claim 1, wherein said estimating corresponding expected response times comprises estimating each of the expected response times according to a comparison of a corresponding current workload of the software application with the performance trend.

5. The method according to claim 1, wherein said determining a performance trend comprises:
   detecting one or more environment parameters of the software application; and
   determining the performance trend according to the one or more environment parameters.

6. The method according to claim 1, wherein said determining a performance trend comprises:
   submitting one or more sample requests to the software application; and
   determining the performance trend according to corresponding sample response times for serving the one or more sample requests.

7. The method according to claim 6, further comprising:
   logging the operation requests being submitted to the software application by the one or more client computing machines; and
   determining the sample requests according to the operation requests being logged.

8. The method according to claim 6, wherein said determining a performance trend comprises:
   detecting one or more environment parameters of the software application, and
   determining the performance trend according to the one or more environment parameters; and
   estimating the expected response time of each of the operation requests according to the performance trend corresponding to one of the sample requests either by matching the operation request or according to the performance trend based on the environment parameters.

9. The method according to claim 1, further comprising:
   logging the operation requests being submitted to the software application by the one or more client computing machines in association with an indication of corresponding actual response times; and
   determining the performance trend according to the actual response times of the operation requests being logged.

10. The method according to claim 1, further comprising:
    receiving corresponding performance limits for one or more users of the one or more client computing machines; and
    determining the warnings for each of the users according to a comparison of the corresponding expected response times with the performance limit of the user.

11. The method according to claim 1, further comprising:
    transmitting the performance artifacts to the corresponding one or more client computing machines to cause each of the one or more client computing machines to:
       display the command in the user interface framework with a visual clue according to the corresponding expected response time;
       disable the command in the user interface framework according to the corresponding expected response time; and
       display a warning message according to the corresponding expected response time in response to a selection of the command before submitting the operation request to the server computing machine.

12. The method according to claim 1, wherein said transmitting corresponding performance artifacts comprises:
    updating the user interface framework for the one or more client computing machines according to the corresponding warnings; and
    returning the user interface framework being updated according to the corresponding warnings to the one or more client computing machines to cause the one or more client computing machines to display the user interface framework being updated according to the corresponding warnings.

13. A computer program product for estimating expected response times, wherein the software application interacts with one or more databases and each of the operation requests involves an execution of one or more queries on the one or more databases, and the computer program product comprising:
    one or more computer-readable tangible storage medium and program instructions stored on at least one of the one or more tangible storage medium, the program instructions executable by a processor, the program instructions comprising:
    program instruction to determine, by the server computing machine, a performance trend of a software application, wherein the performance trend models one or more performance indicators of the software application as a function of one or more operative conditions;
    program instructions to receive corresponding access requests from a one or more client computing machines for a user interface framework of the software application;
    program instructions to estimate corresponding expected response times of the software application for serving the operation requests in response to the access requests; and
    program instructions to transmit corresponding performance artifacts based on the expected response times in association with the user interface framework to the one or more client computing machines to cause the one or more client computing machines to provide corresponding warnings.

14. The computer program product of claim 13, wherein said program instructions to estimate corresponding expected response times comprises program instructions to estimate each of the expected response times according to a comparison of an operation type of the corresponding operation request with the performance trend.

15. A computer system for estimating expected response times, the computer system comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    determining, by the server computing machine, a performance trend of a software application, wherein the software application interacts with one or more databases and each of the operation requests involves an execution of one or more queries on the one or more databases, and wherein the performance trend models one or more performance indicators of the software application as a function of one or more operative conditions;

receiving corresponding access requests from a one or more client computing machines for a user interface framework of the software application;

estimating corresponding expected response times of the software application for serving the operation requests in response to the access requests; and transmitting corresponding performance artifacts based on the expected response times in association with the user interface framework to the one or more client computing machines to cause the one or more client computing machines to provide corresponding warnings.

16. The computer system of claim 15, wherein said estimating corresponding expected response times comprises estimating each of the expected response times according to a comparison of an operation type of the corresponding operation request with the performance trend.

17. The computer system of claim 15, wherein said determining a performance trend comprises:

detecting one or more environment parameters of the software application; and determining the performance trend according to the one or more environment parameters.

* * * * *